United States Patent [19]
Goodridge et al.

[11] Patent Number: 4,670,034
[45] Date of Patent: Jun. 2, 1987

[54] INTERNAL BLOWER FOR EXPANDING CYLINDRICAL VEIL OF MINERAL FIBERS AND METHOD OF USING SAME

[75] Inventors: Paul A. Goodridge, Granville; Roger J. Bilen, Newark; Farrokh Kaveh, Dublin; David C. K. Lin, Newark, all of Ohio

[73] Assignee: Owens-Corning Fiberglas Corporation, Toledo, Ohio

[21] Appl. No.: 811,212

[22] Filed: Dec. 20, 1985

[51] Int. Cl.⁴ .................... C03B 37/04; C03B 37/06
[52] U.S. Cl. .............................. 65/4.4; 65/6; 65/9; 65/14
[58] Field of Search ............ 65/6, 14, 4.4, 9

[56] References Cited

U.S. PATENT DOCUMENTS

| | | | |
|---|---|---|---|
| 2,609,566 | 9/1952 | Slayter et al. | 65/6 |
| 2,855,626 | 10/1958 | Firnhaber | 65/14 |
| 2,931,422 | 4/1960 | Long | 65/14 |
| 3,014,235 | 12/1961 | Snow | 65/6 |
| 3,114,618 | 12/1963 | Levecque et al. | 65/14 |
| 3,215,514 | 11/1965 | Levecque et al. | 65/6 |
| 3,285,723 | 11/1966 | Levecque et al. | 65/15 |
| 3,346,356 | 10/1967 | Anderson et al. | 65/14 |
| 3,650,716 | 3/1972 | Brossard | 65/6 |
| 4,046,539 | 9/1977 | Pitt | 65/6 |
| 4,277,436 | 7/1981 | Shah et al. | 65/6 X |
| 4,478,624 | 10/1984 | Battigelli et al. | 65/4.4 |
| 4,534,779 | 8/1985 | Herschler | 65/6 |
| 4,544,393 | 10/1985 | Bilen | 65/6 |

Primary Examiner—Robert Lindsay
Attorney, Agent, or Firm—Ronald C. Hudgens; Greg Dziegielewski; Ted C. Gillespie

[57] ABSTRACT

A downwardly moving cylindrical veil of mineral fibers is distributed to form a mineral fiber product by impinging on the interior of the veil jets of gas from an internal blower positioned within the veil to increase the angular velocity of the veil, thereby causing the veil to break up into an incoherent flow of mineral fibers.

14 Claims, 5 Drawing Figures

4,670,034

INTERNAL BLOWER FOR EXPANDING CYLINDRICAL VEIL OF MINERAL FIBERS AND METHOD OF USING SAME

TECHNICAL FIELD

This invention relates to the production of mineral fibers and mineral fiber products. More specifically, this invention relates to handling mineral fibers traveling in a gaseous flow, having been produced by a mineral fiberizing process.

BACKGROUND OF THE INVENTION

The common practice in forming fibers of mineral material, such as glass fibers, is to pass the material in a molten state through the orifices of the peripheral wall of a centrifuge or spinner to create primary fibers. Thereafter, the primary fibers are further attenuated into secondary fibers of smaller diameter by the action of a flow of gases discharged downwardly from an external annular blower. Some fiber forming processes, such as the Supertel process, use a high velocity gaseous burner for the secondary attenuation of the mineral fibers. Other fiberizing processes, such as low energy processes, use blowers to turn the mineral fibers into a downwardly moving cylindrical veil.

All of these processes produce a downwardly moving substantially cylindrical veil of swirling gases and mineral fibers which are then collected on a forming chain in a forming hood. The diameter of the cylindrical veil will vary, depending on the fiberizing process employed, but in almost all cases it is necessary to widen the veil or distribute the veil in order to produce a mineral fiber product which is wider than the original veil of mineral fibers.

Numerous devices have been employed in the past to distribute the veil. These include mechanical impingement devices and many different kinds of gaseous jets. The aim of each of these distribution techniques is to produce a mineral fiber product having uniform fiber density across the width of the product. Also, it is important not to damage the fibers during the distribution process. Further, it is desirable to employ as little additional air or other gases as possible in the distribution process to avoid the burden of treating the additional gases for environmental purposes. A distribution method which increases the turbulence of the gaseous flows in the forming hood is undesirable because of fiber blow-back and the increased suction requirements beneath the forming chain.

The problem with most of the present veil distribution methods is that the veil is maintained as a relatively coherent, downwardly flowing, swirling flow of gases and mineral fibers, while it is lapped or distributed from side to side of the forming chain. Gaseous distribution devices, in combination with the suction of the fans beneath the forming chain, blast the fibers onto the forming chain, in the nature of a "slam dunk". There has long been a need for an improved system for distributing the fibers in the veil. Preferably, this system would transform the veil into a gently downwardly flowing incoherent mixture of fibers, in the nature of a snowstorm. The snowstorm distribution would avoid problems of blow-back, reduce the amount of air needed to be environmentally treated, and facilitate uniform density of the fibers across the width of the pack. The fibers would be merely floating downwardly, primarily under the influence of gravity, and could have their paths changed by suction in order to fill light spots in the pack because of the increased suction at those spots. Thus, there is a need for a distribution method and apparatus to turn the downwardly moving cylindrical veil of fibers into an incoherent gentle flow of fibers.

SUMMARY OF THE INVENTION

There has now been invented a method and apparatus which employs an internal blower positioned within the veil, rotating with the spinner, and discharging jets of gas pointing in the direction of rotation of the blower to increase the angular velocity of the veil, thereby causing the veil to break up into an incoherent "snowstorm" flow of mineral fibers. Instead of the ropes and stringy sheets resulting from the prior art devices, the fibers fall to the forming chain as small tufts or clumps. The blower of the invention enables the distribution of the fibers with lower blower energy than usually employed in air-lapping systems, and lower energy due to reduced suction requirements beneath the forming chain. The invention also saves energy by reducing the amount of gases that require environmental treatment. The fiber quality is enhanced because the fibers are not impinging on a mechanical lapping device, and are not blasted onto the forming chain. The mineral fiber product has an improved uniformity across the width of the product, and an improved pack integrity to resist delamination. Also, the more gentle treatment of the fibers and the reduced suction requirements result in a product having higher recovery, and consequently, higher R value per pound of glass.

According to this invention, there is provided apparatus for expanding a veil of mineral fibers comprising a rotatable spinner for discharging mineral fibers, an external blower for turning the mineral fibers into a downwardly moving cylindrical veil, and an internal blower mounted for rotation beneath the spinner and in the direction of rotation of the spinner, the internal blower being adapted with discharge passageways for discharging gases into contact with the veil to expand the veil, the passageways forming an angle with a blower radius in a horizontal plane, and the passageways being pointed in the direction of rotation of the spinner.

In a specific embodiment of the invention, the internal blower is sufficiently vertically spaced from the spinner to avoid affecting the formation of the mineral fibers.

In another specific embodiment of the invention, the angle of orientation of the passageways is within the range of from about 20° to about 90° from a blower radius. Preferably, the angle is within the range of from about 40° to about 80°.

In another specific embodiment of the invention, the passageways are substantially in a horizontal plane.

In a preferred embodiment of the invention, the passageways are angularly spaced apart around the periphery of the blower by about 5°.

According to this invention, there is also provided a method for expanding a veil of mineral fibers comprising discharging mineral fibers from a rotating spinner, turning the mineral fibers into a downwardly moving cylindrical veil, rotating an internal blower in the direction of rotation of the spinner, the internal blower being positioned beneath the spinner, and discharging jets of gas from passageways positioned in the internal blower to expand the veil, the jets being discharged at an angle with the blower radius in a horizontal plane, and the passageways being pointed in the direction of rotation of the spinner.

DESCRIPTION OF THE INVENTION

The invention will be described in terms of a glass fiber forming, distribution and collection operation, although it is to be understood that the invention can be practiced using other heat-softenable mineral material, such as rock, slag and basalt.

Figure 1:
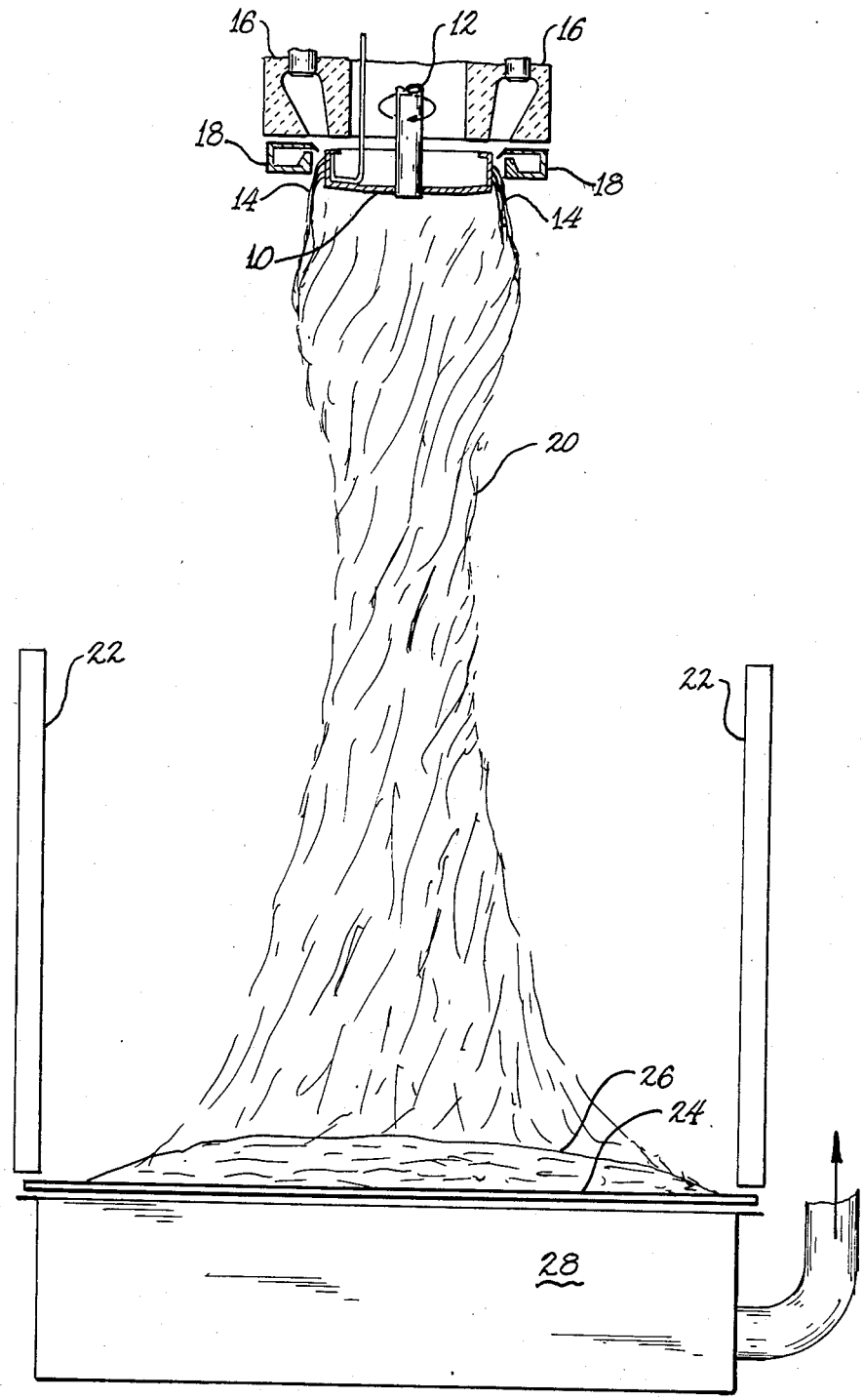
FIG. 1 is a schematic cross-sectional view in elevation of prior art apparatus for forming a downwardly moving cylindrical veil of fibers.

As shown in FIG. 1, spinner 10 is mounted for rotation on quill 12 for the production of mineral fibers 14. The mineral fiber forming process can be facilitated by the heat supplied from annular burners 16 for more efficient production. The mineral fibers are turned down and/or further attenuated by annular external blower 18 to form downwardly moving veil 20. Although the veil is a swirling, locally turbulent flow of hot gases and mineral fibers, it can be loosely described as being substantially cylindrical. The veil has a rotation imparted by the rotation of the spinner. In the absence of any distribution equipment, the veil has a tendency to neck down into a narrower diameter before slightly expanding as it flows downwardly, as shown in FIG. 1.

The veil maintains a substantially coherent shape as it travels through the forming hood 22 and is deposited on forming chain 24 to produce insulation pack 26. Positioned beneath the forming chain is suction box 28, evacuated by means, not shown. In the absence of veil distribution devices, the mineral fibers would be deposited primarily in the center lane of the forming chain resulting in a pack having a very non-uniform thickness and density across its width.

Figure 2:
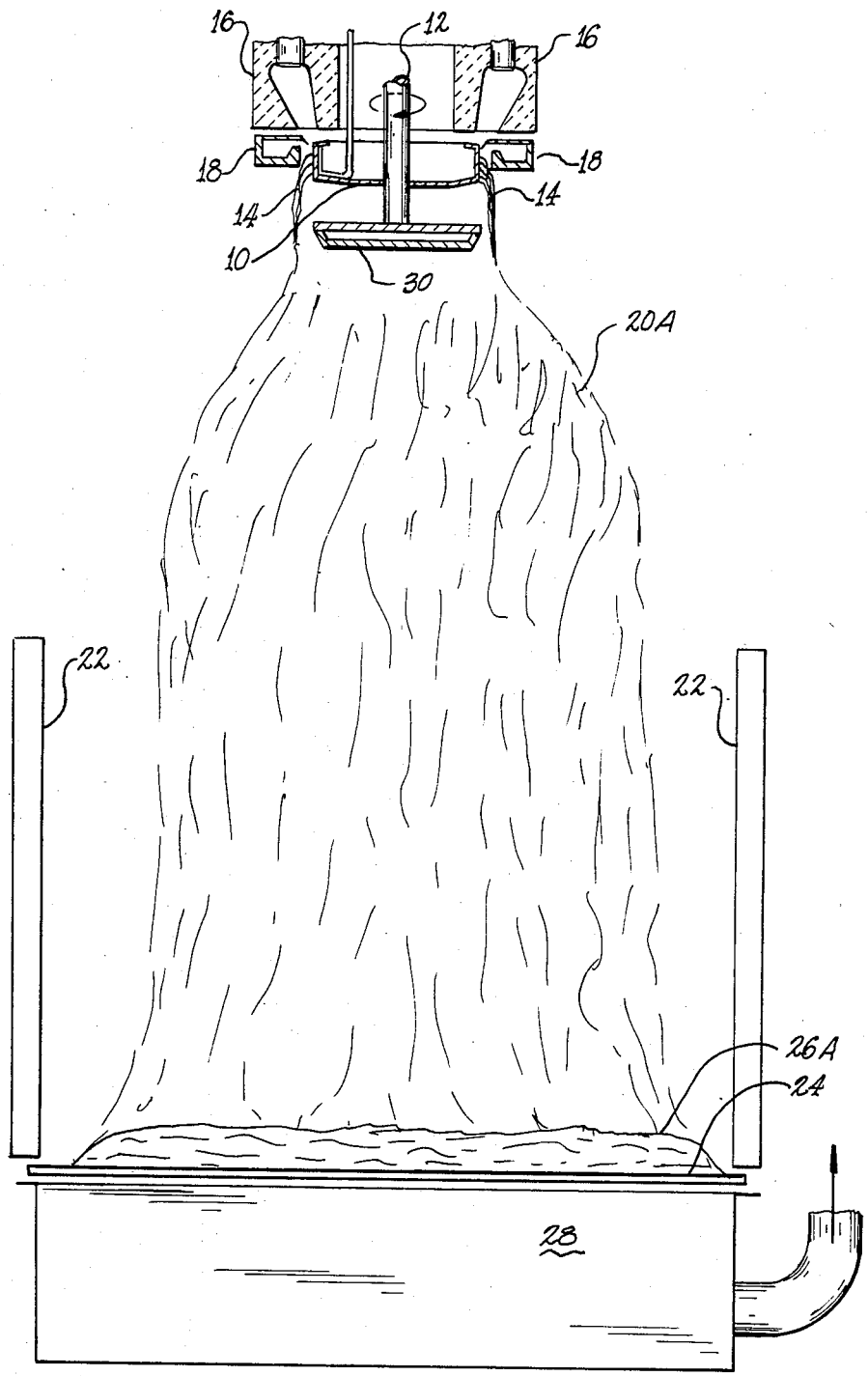
FIG. 2 is a schematic cross-sectional view in elevation of the apparatus of the invention for forming a cylindrical veil of mineral fibers and for expanding the veil.

In contrast with the prior art, the apparatus of the invention shown in FIG. 2 illustrates that the veil is destroyed or broken up into a slowly moving, incoherent flow 20A of fibers and gases, in the nature of a snowstorm. Insulation pack 26A is formed by this nearly random flow of fibers, and this pack is generally uniform in density across the width of the pack.

The veil is caused to be broken up by the action of internal blower 30, positioned for rotation beneath the spinner. The jets of gas coming from the internal blower increase the angular velocity of the fibers and air in the veil, thereby causing the veil to be pulled apart by centrifugal forces. It has been found to be easier to affect the flow of fibers by using an internal blower rather than an external blower, because the fibers in the veil are more closely concentrated in the interior of the veil.

As shown, the internal blower can be mounted for rotation with the spinner. The internal blower could also be independently mounted for rotation, but it must rotate in the same direction as the rotation of the spinner.

Figure 3:
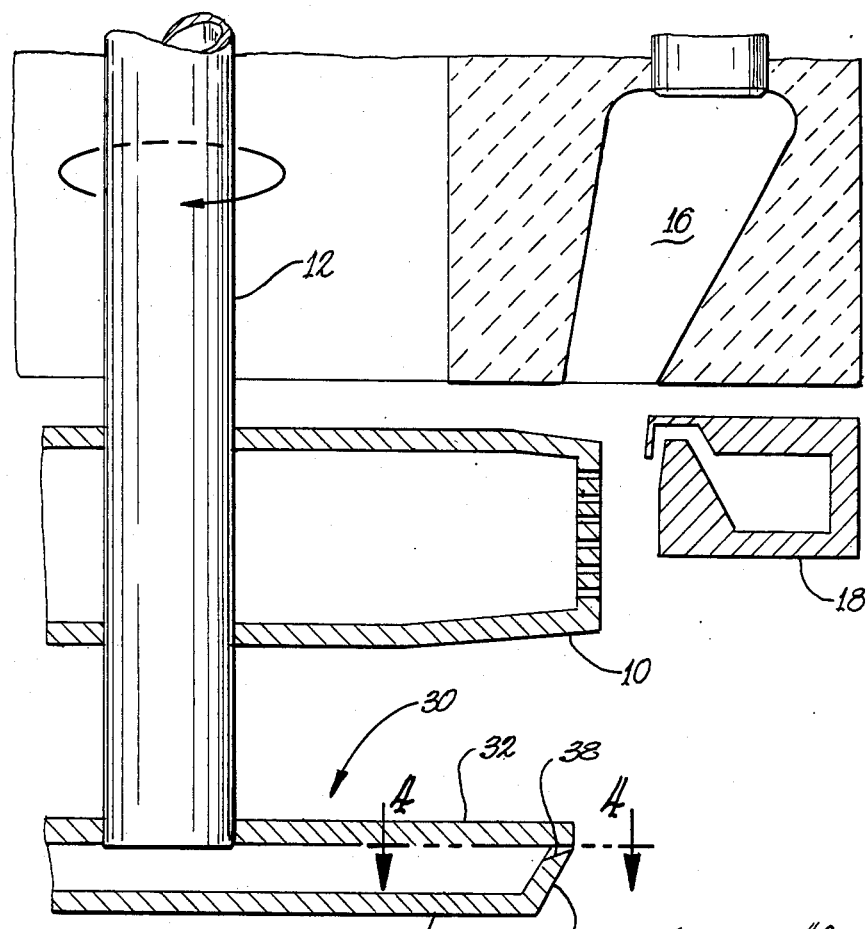
FIG. 3 is a schematic cross-sectional view in elevation of the internal blower of the invention.

The internal blower is shown in greater detail in FIG. 3, in which the blower can be seen to be comprised of blower top plate 32 and blower bottom plate 34 defining an air flow route, from a source of pressurized air, not shown. The air can be supplied at any suitable rate, such as, for example, 100 scfm (2.83 meter$^3$ per minute). The blower bottom plate is with blower flange 36 at the periphery of the blower. The blower flange is adapted with a plurality of passageways for distributing jets of gas into contact with the veil. The passageways can be of any suitable shape and number, such as slots 38.

Figure 4:
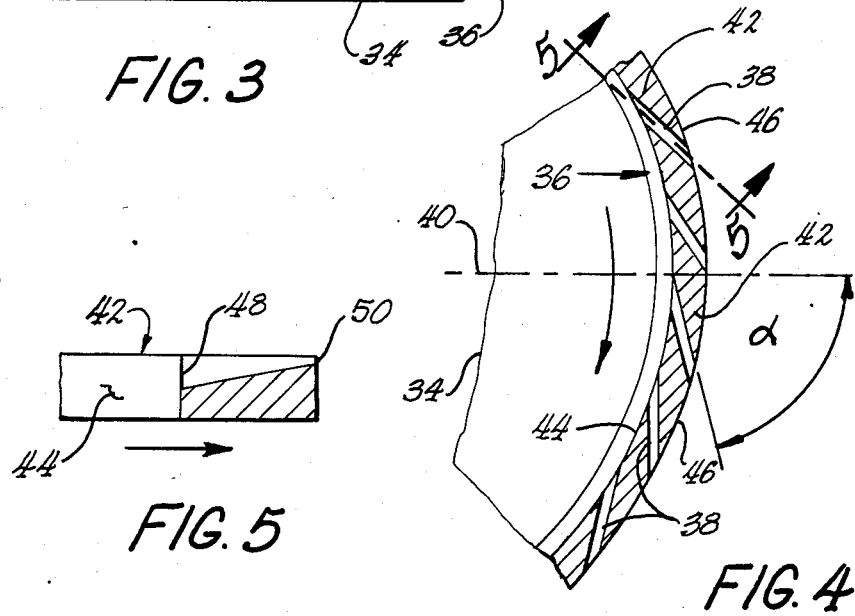
FIG. 4 is a schematic plan view of a portion of the internal blower of FIG. 3, taken along line 4—4.

As shown in FIG. 4, the slots are not oriented on a radius of the blower, such as would be indicated by radius line 40, but are located on an angle with the radius, such as angle alpha. The slots are pointing in the direction of rotation of the spinner, when viewed in the horizontal plane. The jets of gas emanating from the slots are thus the result of both the pressure of the gas supply, and the angular momentum resulting from the rotation of the internal blower.

Angle alpha is preferably within the range of from about 90° to about 20°, and more preferably within the range of from about 80° to about 40°. In a specific embodiment of the invention, angle alpha is 75°.

As shown in FIG. 4 the slots 38 alternate with lands 42 between the inside periphery 44 of the flange and the outside periphery 46 of the flange.

Figure 5:
FIG. 5 is a schematic sectional view in elevation of an internal blower passageway, taken along line 5—5 of FIG. 4.

As shown in FIG. 5, the slots can be tapered from the inside end 48 of the slot to the outside end 50 of the slot. In the preferred embodiment of the invention, the inside end of the slot has a thickness of 0.076 inches (0.19 cm), and the outside end of the slot has a thickness of 0.015 inches (0.038 cm).

It has been found that when the internal blower is positioned too close to the spinner, the fiber forming process is affected. For example, when the internal blower was positioned immediately beneath the spinner, the change in air flows in the fiber forming vicinity caused an increase in the average fiber diameter of 2HT (½ micron). Preferably, the internal blower is positioned at a distance beneath the spinner within the range of from about one-sixth to about one full spinner diameter. Most preferably, the internal blower is positioned at a distance beneath the spinner within the range of from about one-quarter to about three-quarters of the spinner diameter.

The slots in the spinner are preferably horizontal, although an upward or downward orientation can also be given to the slots. An upward orientation could run into the problem of affecting the fiber forming process. A downward orientation merely would add to the downward thrust of the fibers, and this would be detrimental to the goal of reducing the suction requirements beneath the forming chain.

It will be evident from the foregoing that various modifications can be made to this invention. Such, however, are considered as being within the scope of the invention.

INDUSTRIAL APPLICABILITY

This invention will be found to be useful in the production of mineral fibers and mineral fiber products, such as glass fibers and glass fiber products, for such uses as thermal insulation and acoustical insulation.

We claim:

1. Apparatus for expanding a veil of mineral fibers comprising a rotatable spinner for discharging mineral fibers, an external blower for turning the mineral fibers into a downwardly moving cylindrical veil, and an internal blower mounted for rotation beneath said spinner and in the direction of rotation of said spinner, said internal blower being adapted with discharge passageways for discharging gases into contact with said veil to expand said veil, said passageways forming an angle with a blower radius in a horizontal plane, and said passageways being pointed in the direction of rotation of said spinner.

2. The apparatus of claim 1 in which said internal blower is sufficiently vertically spaced from said spinner to avoid affecting the formation of the mineral fibers.

3. The apparatus of claim 2 in which said internal blower is positioned at a distance beneath the spinner within the range of from about one-sixth to about one full diameter of said spinner.

4. The apparatus of claim 1 in which said angle is within the range of from about 20° to about 90°.

5. The apparatus of claim 4 in which said angle is within the range of from about 40° to about 80°.

6. The apparatus of claim 1 in which said passageways are substantially in a horizontal plane.

7. The apparatus of claim 1 in which said passageways are angularly spaced apart by about 5°.

8. A method for expanding a veil of mineral fibers comprising discharging mineral fibers from a rotating spinner, turning the mineral fibers into a downwardly moving cylindrical veil, rotating an internal blower in the direction of rotation of said spinner, said internal blower being positioned beneath said spinner, and discharging jets of gas from passageways positioned in said internal blower to expand said veil, said jets being discharged at an angle with a blower radius in a horizontal plane, and said passageways being pointed in the direction of rotation of said spinner.

9. The method of claim 8 comprising vertically spacing said internal blower from said spinner to avoid affecting the formation of the mineral fibers.

10. The method of claim 8 in which said angle of discharge of said jets of gas is within the range of from about 20° to about 90°.

11. The of claim 10 in which said angle of discharge of said jets of gas is within the range of from about 40° to about 80°.

12. The of claim 8 comprising discharging said jets of gas substantially in a horizontal plane.

13. A method for expanding a downwardly moving cylindrical veil of mineral fibers comprising contacting said veil with jets of gas from an internal blower positioned within said veil to increase the angular velocity of said veil to an extent sufficient to cause said veil to break up into an incoherent flow of mineral fibers.

14. The method of claim 13 in which said jets of gas do not affect the formation of mineral fibers.

* * * * *